US012138135B2

(12) United States Patent
Eldib et al.

(10) Patent No.: US 12,138,135 B2
(45) Date of Patent: Nov. 12, 2024

(54) CHEEK RETRACTOR WITH AEROSOL SUCTION

(71) Applicants: Ahmed Eldib, Ann Arbor, MI (US); Sean W. Carroll, Detroit, MI (US); Ramy S. Habib, Detroit, MI (US)

(72) Inventors: Ahmed Eldib, Ann Arbor, MI (US); Sean W. Carroll, Detroit, MI (US); Ramy S. Habib, Detroit, MI (US)

( * ) Notice: Subject to any disclaimer, the term of this patent is extended or adjusted under 35 U.S.C. 154(b) by 133 days.

(21) Appl. No.: 17/570,618

(22) Filed: Jan. 7, 2022

(65) Prior Publication Data

US 2022/0218454 A1 Jul. 14, 2022

Related U.S. Application Data

(60) Provisional application No. 63/135,050, filed on Jan. 8, 2021.

(51) Int. Cl.
*A61C 17/10* (2006.01)

(52) U.S. Cl.
CPC .......... *A61C 17/10* (2019.05); *A61C 2201/00* (2013.01)

(58) Field of Classification Search
CPC .. A61C 5/90; A61C 17/10; A61B 1/24; A61N 2005/1094
See application file for complete search history.

(56) References Cited

U.S. PATENT DOCUMENTS 2,937,445 A * 5/1960 Erickson .................. A61B 1/24 433/93
3,916,880 A * 11/1975 Schroer .................. A61C 17/10 600/242
4,019,255 A * 4/1977 Cohen .................... A61C 17/10 600/242
7,300,401 B2 * 11/2007 Patrickus ............... A61C 17/10 600/242
7,785,105 B2 * 8/2010 Anderson .............. A61C 17/08 433/91
10,307,049 B2 6/2019 Hines et al.
(Continued)

FOREIGN PATENT DOCUMENTS

CN 108888233 A 11/2018
CN 210019748 U 2/2020

OTHER PUBLICATIONS

Cefla Medical Equipment, WS Aerosol Defender, May 2020, 2 pages.

*Primary Examiner* — Ralph A Lewis
(74) *Attorney, Agent, or Firm* — Brooks Kushman P.C.

(57) ABSTRACT

A cheek retraction or dental device is provided with a member forming an arm extending between and connecting a first retractor and a second retractor. Each retractor defines an internal passage and an aperture. A nasal tube defines another internal passage and an aperture, and the nasal tube extends between and is in fluid communication with the passages of the first and second retractors. A fluid connector to connect the dental device to a remote vacuum source is supported by the arm and in fluid communication with the first and second passages. The apertures of the first and second retractors face towards one another such that aerosols flow from an oral cavity of a patient into the passages of the retractors. The aperture of the nasal tube faces away from the arm such that aerosols flow from a nasal passage of the patient into the passage of the nasal tube.

19 Claims, 10 Drawing Sheets

(56) References Cited

U.S. PATENT DOCUMENTS

| | | | | |
|---|---|---|---|---|
| 10,675,126 | B2 * | 6/2020 | Bohlman | A61C 5/90 |
| 2007/0218422 | A1 * | 9/2007 | Ehrenfeld | A61C 5/90<br>433/140 |

* cited by examiner

CHEEK RETRACTOR WITH AEROSOL SUCTION

CROSS-REFERENCE TO RELATED APPLICATIONS

This application claims the benefit of U.S. provisional application Ser. No. 63/135,050 filed Jan. 8, 2021, the disclosure of which is hereby incorporated in its entirety by reference herein.

TECHNICAL FIELD

Various embodiments relate to a cheek retractor with suction for aerosols, such as for use in dental procedures.

BACKGROUND

During dental examinations, procedures, or treatments the patient is in a dental chair with the dentist, hygienist, or other dental professional in close proximity to the patient. During a dental procedure, a saliva ejector is often used to remove liquids from the inside of a patient's mouth or oral cavity, including saliva. However, the saliva ejector does not remove aerosols, including particles, aerosolized fluid particles, droplets, and the like that may be created during the dental procedure, or as exhaled air via the patient's mouth or nose. These aerosols may contain bioaerosols, that contain viruses, bacteria, or other pathogens, and the dental professional may be exposed to these aerosols during a procedure, especially when in close proximity to a patient's mouth and nose.

SUMMARY

In an embodiment, a cheek retraction device includes a member forming an arm extending between and connecting a first retractor and a second retractor. The first and second retractors are opposed to one another, with each of the first and second retractors sized to receive a portion of a lip of a patient. The first retractor defines a first internal passage and a first aperture, and the second retractor defines a second internal passage and a second aperture. A nasal tube defines a third internal passage, with the nasal tube extending between and mechanically coupling the first retractor and the second retractor. The nasal tube is in fluid communication with the first and second passages, is opposite to the arm, and defines a third aperture. A fluid connector is supported by the arm and in fluid communication with the first and second passages, with the fluid connector to connect the cheek retraction device to a remote vacuum source. The first aperture and the second aperture face towards one another such that aerosols flow from an oral cavity of a patient into the first and second passages via the first and second apertures. The third aperture faces away from the arm such that aerosols flow from a nasal passage of the patient into the third passage via the third aperture.

In another embodiment, a cheek retraction device includes a member forming an arm extending between and connecting a first retractor and a second retractor, with the first and second retractors opposed to one another. Each of the first and second retractors are sized to receive a portion of a lip of a patient. The first retractor defines a first internal passage and a first aperture, and the second retractor defines a second internal passage and a second aperture. A fluid connector is supported by the arm and is in fluid communication with the first and second passages. The fluid connector connects the cheek retraction device to a remote vacuum source. The first aperture and the second aperture face towards one another such that aerosols flow from an oral cavity of a patient into the first and second passages via the first and second apertures.

In yet another embodiment, a cheek retraction device includes a member forming an arm extending between and connecting a first retractor and a second retractor, with the first and second retractors opposed to one another. Each of the first and second retractors are sized to receive a portion of a lip of a patient. The first retractor defines a first internal passage extending between first and second tube connectors and a first series of apertures extending transversely therethough and intersecting the first internal passage, and the second retractor defines a second internal passage extending between third and fourth tube connectors and a second series of apertures extending transversely therethough and intersecting the second internal passage. A nasal tube extends between and mechanically couples the first retractor and the second retractor, with the nasal tube being opposite to the arm. The nasal tube has a first end connected to the first tube connector and a second end connected to the third tube connector. The nasal tube defines a third internal passage in fluid communication with at least one of the first and second passages, a pair of apertures extending radially through the nasal tube, and a third series of apertures extending radially through the nasal tube. A fluid connector is supported by the arm to connect the cheek retraction device to a remote vacuum source, with the fluid connector in fluid communication with the first and second internal passages. The first series of apertures, the second series of apertures, and the third series of apertures face towards an inner central region of the cheek retraction device one another such that aerosols flow from an oral cavity of a patient into the first, second, and third passages via the first, second, and third series of apertures, respectively. The pair of apertures face away from the arm and away from the inner central region of the cheek retraction device such that aerosols flow from nasal passages of the patient into the third passage via the pair of apertures.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As used herein, a dental procedure, treatment, or examination includes dental cleanings and examinations, dental procedures such as bonding, bridges or implants, fillings or repairs, crowns and caps, extractions, as well as endodontic procedures, periodontal procedures, oral and maxillofacial surgery, orthodontic procedures, and the like. Likewise, a dental professional as used herein includes dentists, hygienists, oral and maxillofacial surgeons, orthodontists, endodontists, assistants, and the like.

As used herein, an aerosol refers to particles, aerosolized fluid particles, droplets, and the like that are suspended in or carried by gas, e.g. are airborne, and that may be created during the dental procedure. In one example, an aerosol is provided as exhaled air or an exhaled breath via the patient's mouth and/or nose. These aerosols may contain bioaerosols, that contain viruses, bacteria, or other pathogens, and the dental professional may be exposed to these aerosols during a procedure, especially when in close proximity to a patient's mouth and nose. Due to the close proximity, there is a risk of airborne transmission from the patient to the dental professional. According to one non-limiting example, an aerosol may contain a virus such as an RNA virus, including a coronavirus such as COVID-19, SARS, or MERS; an influenza virus, including influenza A or B; a rhinovirus, or the like.

Although the dental professional may wear or use personal protective equipment such as a mask, face shield, goggles, or the like, the patient's nose and mouth are exposed due to the nature of a dental procedure. The present disclosure provides for a cheek retraction device that may be used as a dental apparatus, or dental retractor, that reduces aerosols emitted by a patient breathing, and also reduces aerosols created during the dental procedure itself. For example, an aerosol may be created by a dental tool, including those operated using compressed air and/or water. The present disclosure provides for a dental apparatus that reduces droplets and/or aerosols associated with a patient's mouth, and also reduces droplets and/or aerosols going to and from the patient's nose. The apparatus or cheek retraction device according to the present disclosure may be used in conjunction with mouth or intra-oral suction devices or solely on its own as an aerosol suction device.

Figure 1:
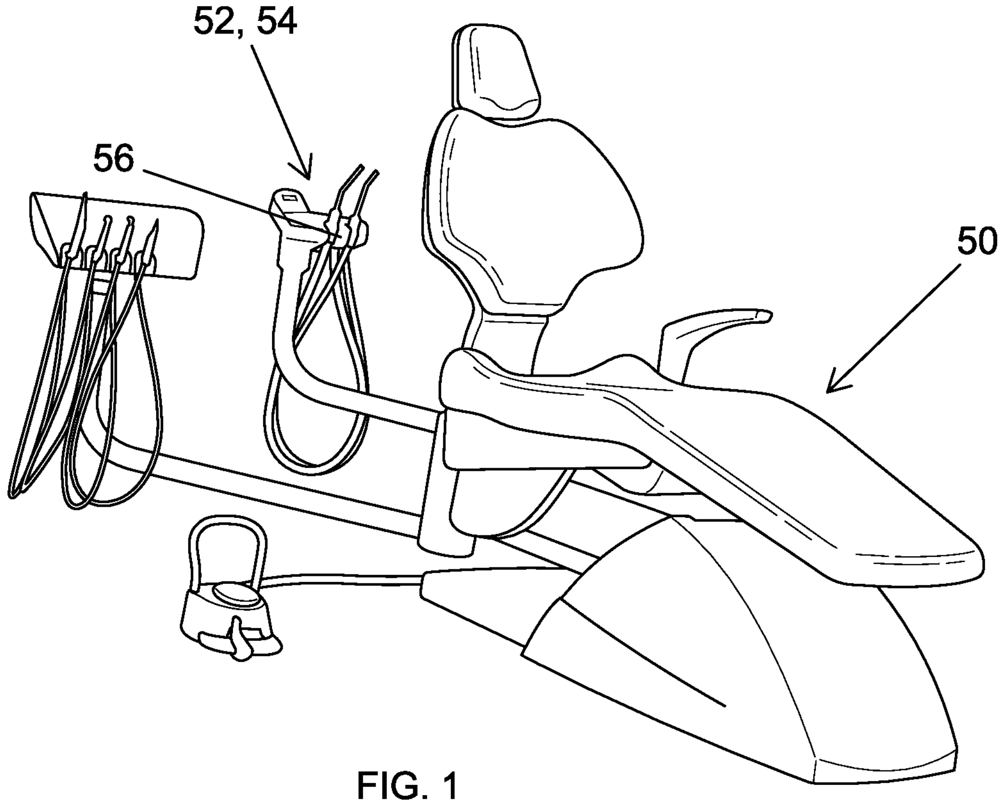
FIG. 1 illustrates a dental chair and appliance for use with the device according to the present disclosure.
Figure 2:
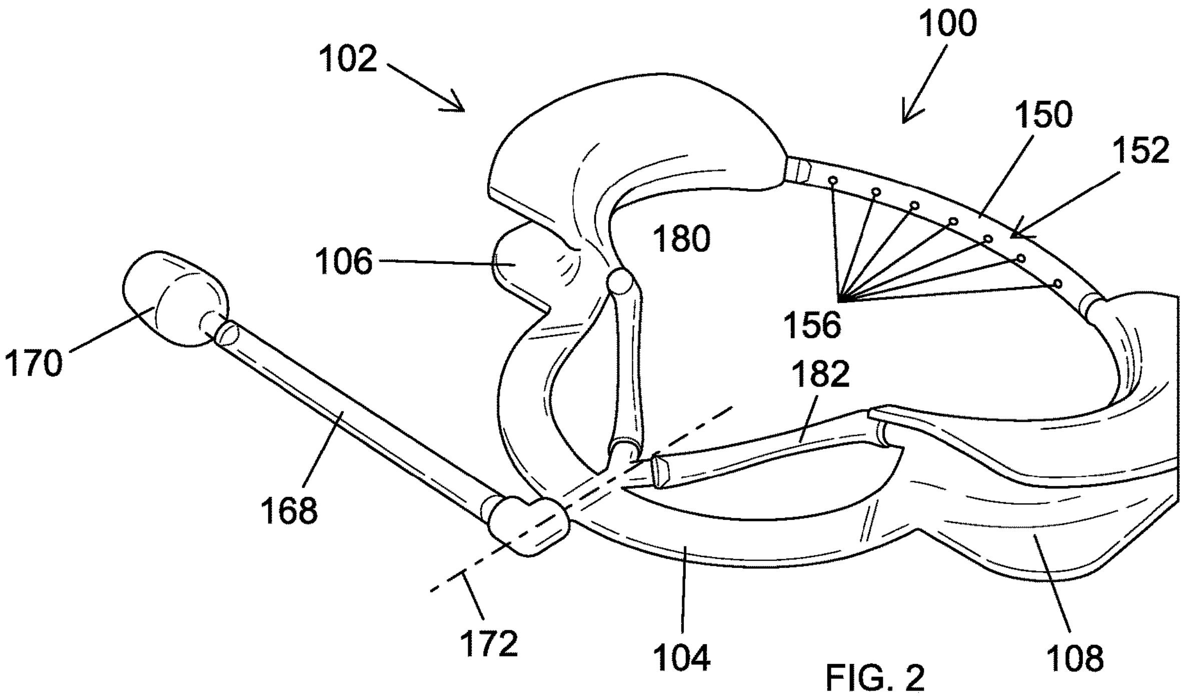
FIG. 2 illustrates a first perspective partial view of a cheek retraction device according to the present disclosure.
Figure 3:
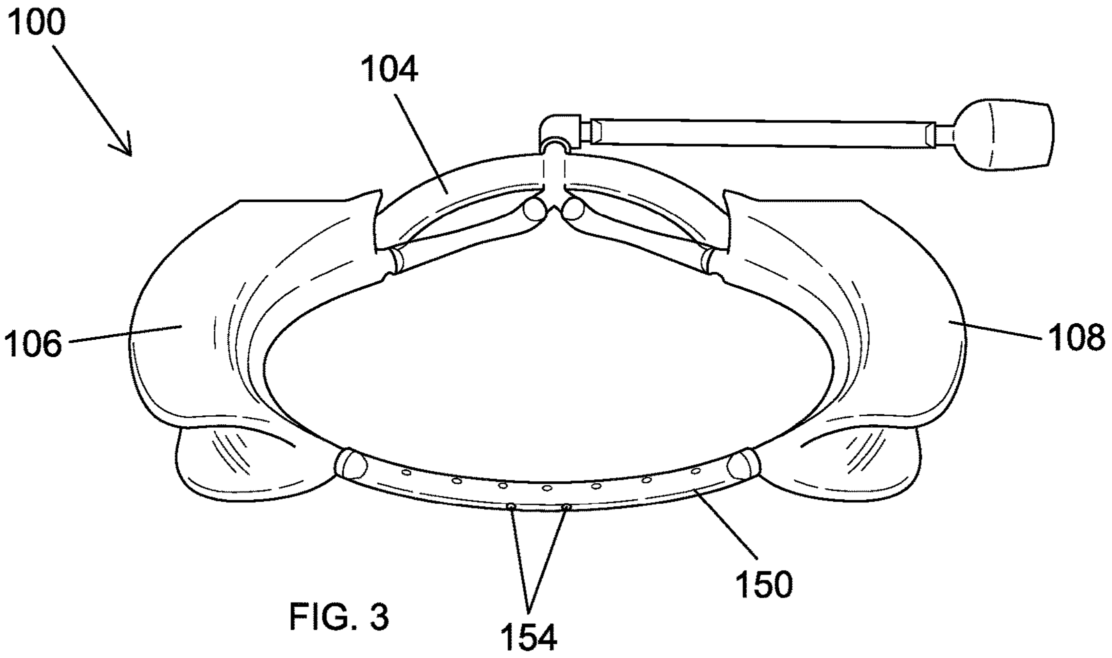
FIG. 3 illustrates a second perspective view of a cheek retraction device according to the present disclosure.
Figure 4:
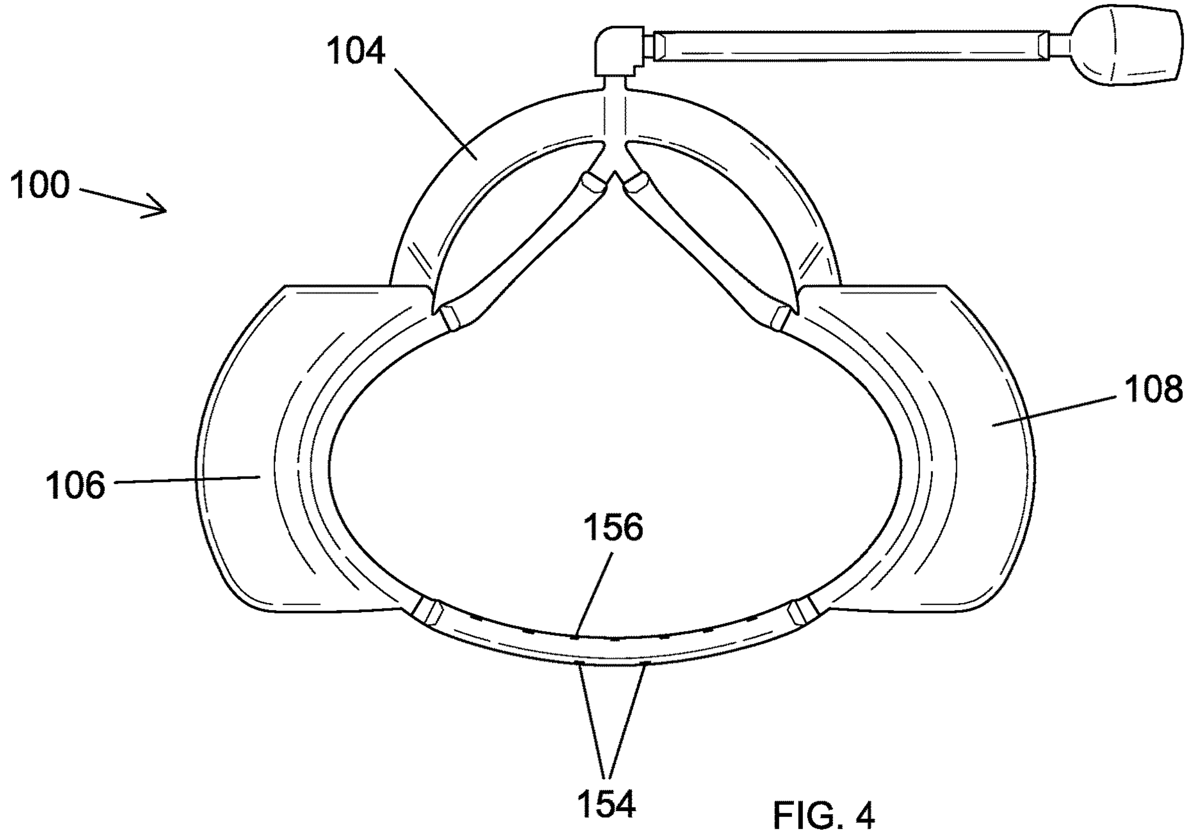
FIG. 4 illustrates a top view of a cheek retraction device according to the present disclosure.
Figure 5:
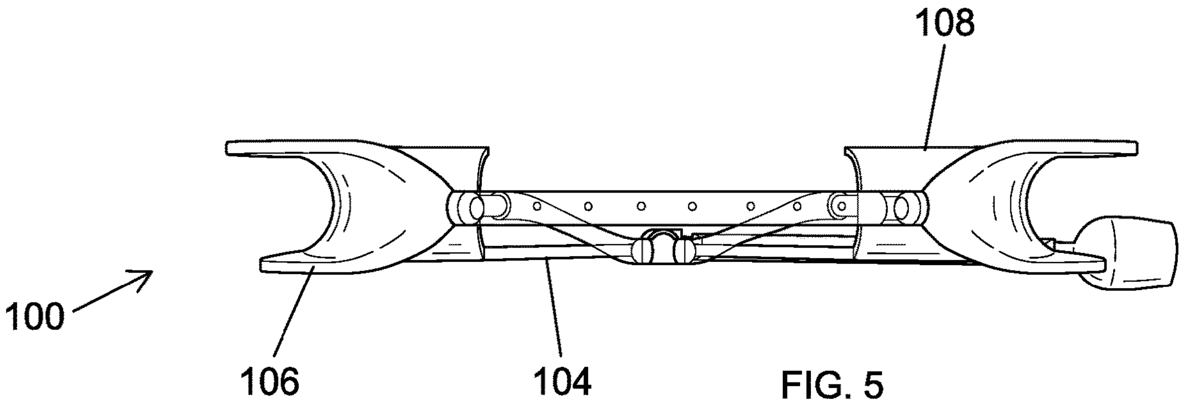
FIG. 5 illustrates an end view of a cheek retraction device according to the present disclosure.
Figure 6:
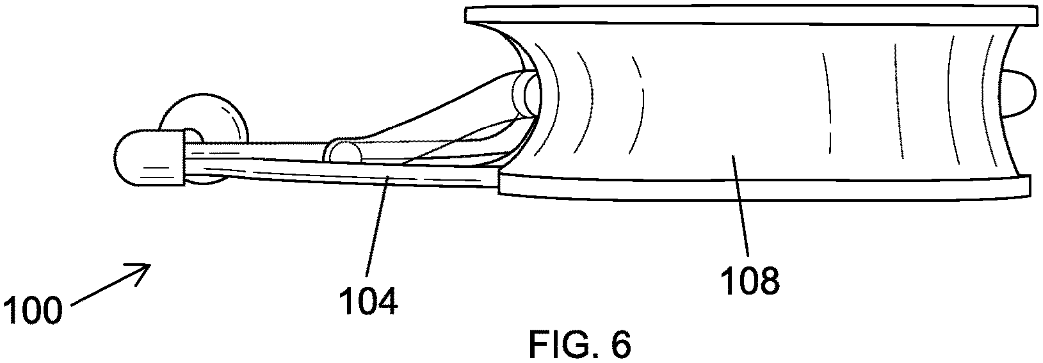
FIG. 6 illustrates a side view of a cheek retraction device according to the present disclosure.
Figure 7:
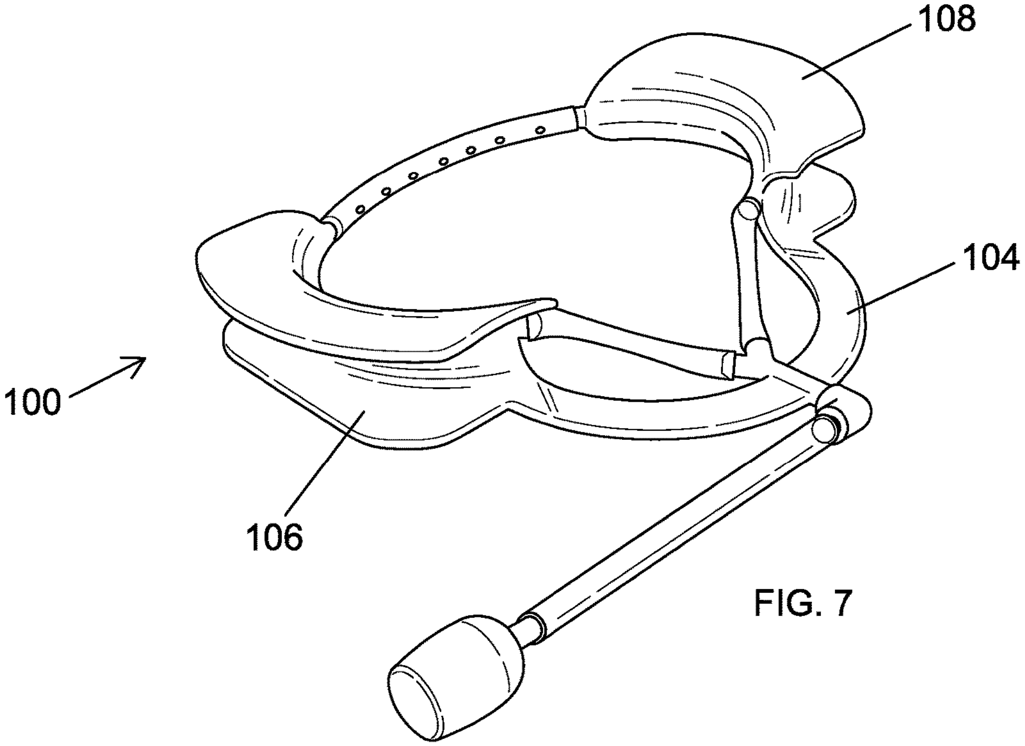
FIG. 7 illustrates a third perspective view of a cheek retraction device according to the present disclosure.
Figure 8:
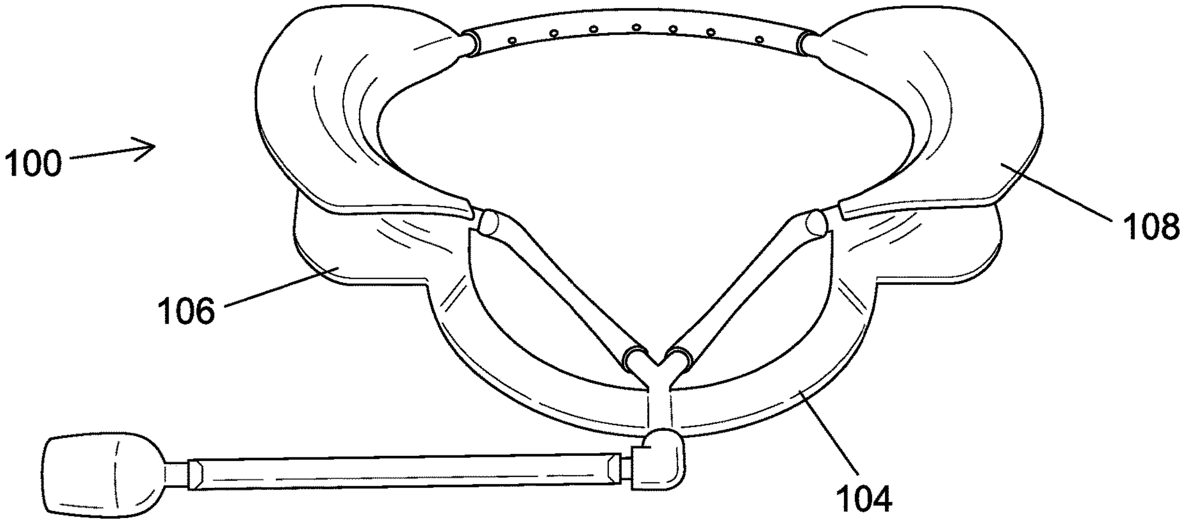
FIG. 8 illustrates a fourth perspective view of a cheek retraction device according to the present disclosure.
Figures 9A, 9B, 9C, 9D, 9E:
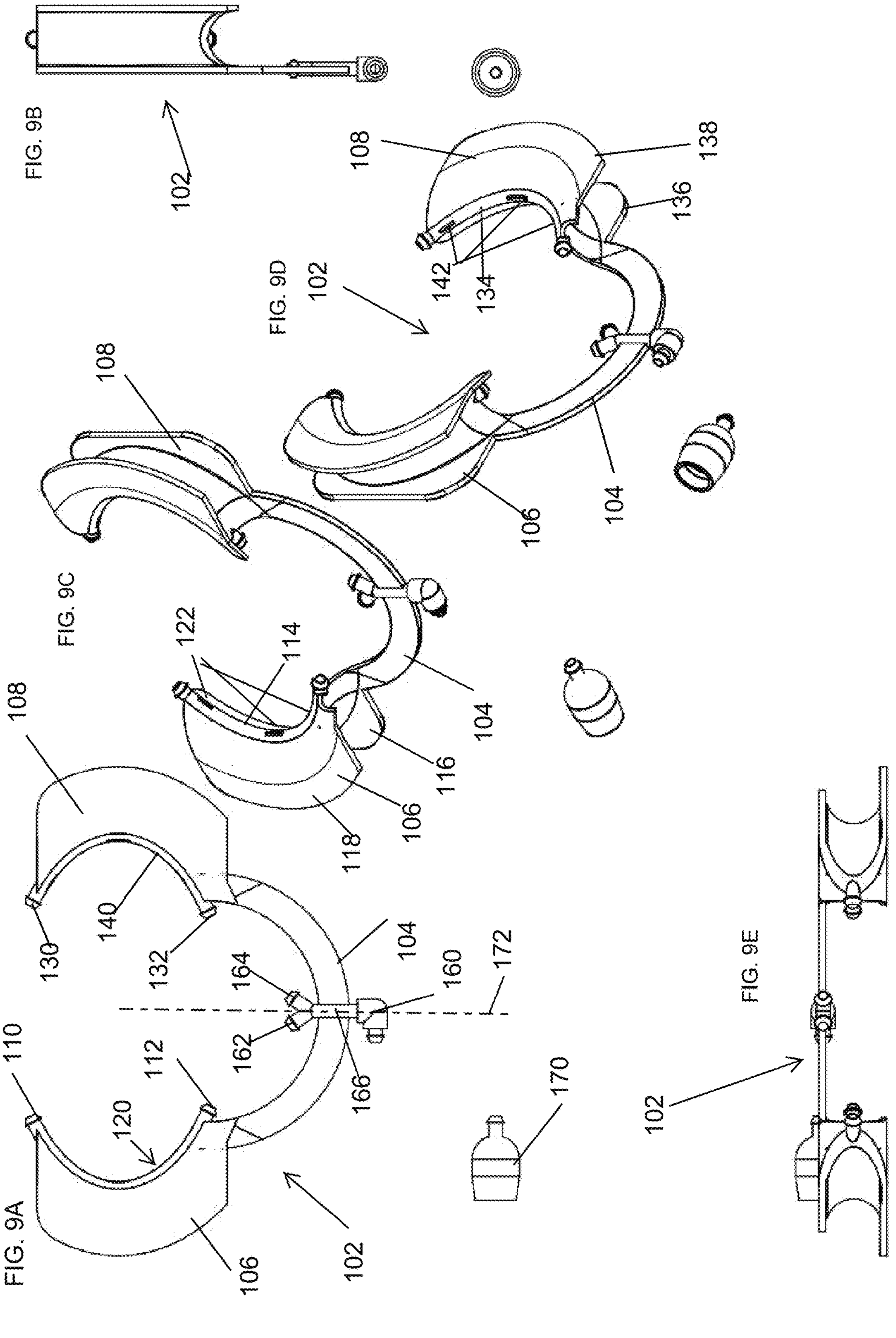
FIGS. 9A-E illustrate various plan, elevation, and perspective schematic views of a member and a vacuum connector fitting according to the present disclosure, and for use with the cheek retraction device of FIG. 2.
Figure 10C:
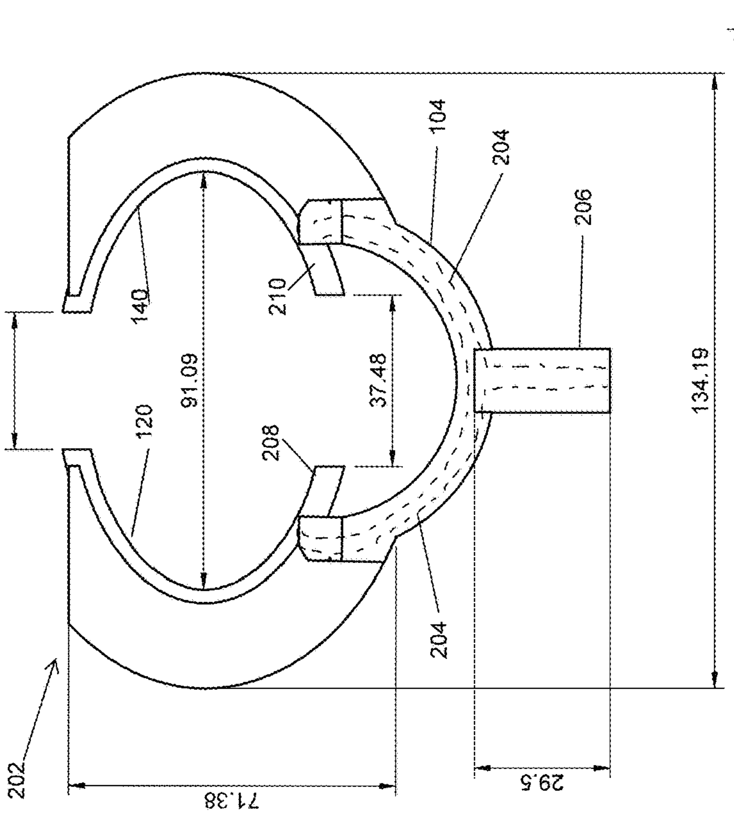
FIGS. 10A-D illustrate various perspective, plan, and elevation schematic views of a member of a cheek retraction device according to another embodiment of the present disclosure.
Figure 10D:
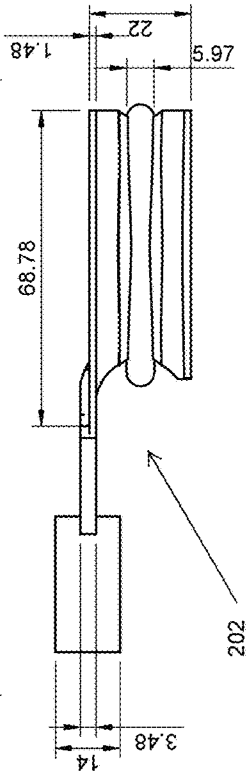
Figure 10A:
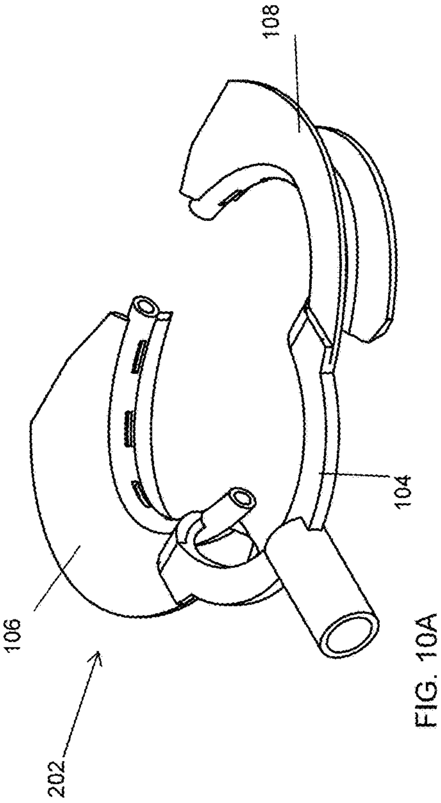
Figure 10B:
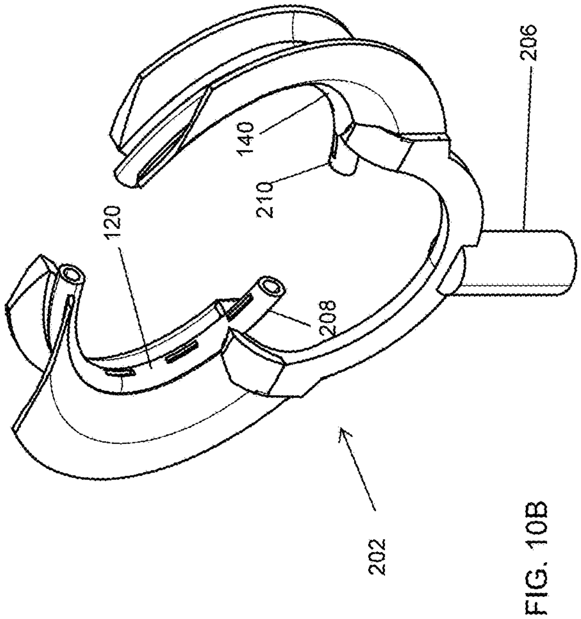
Figure 11A:
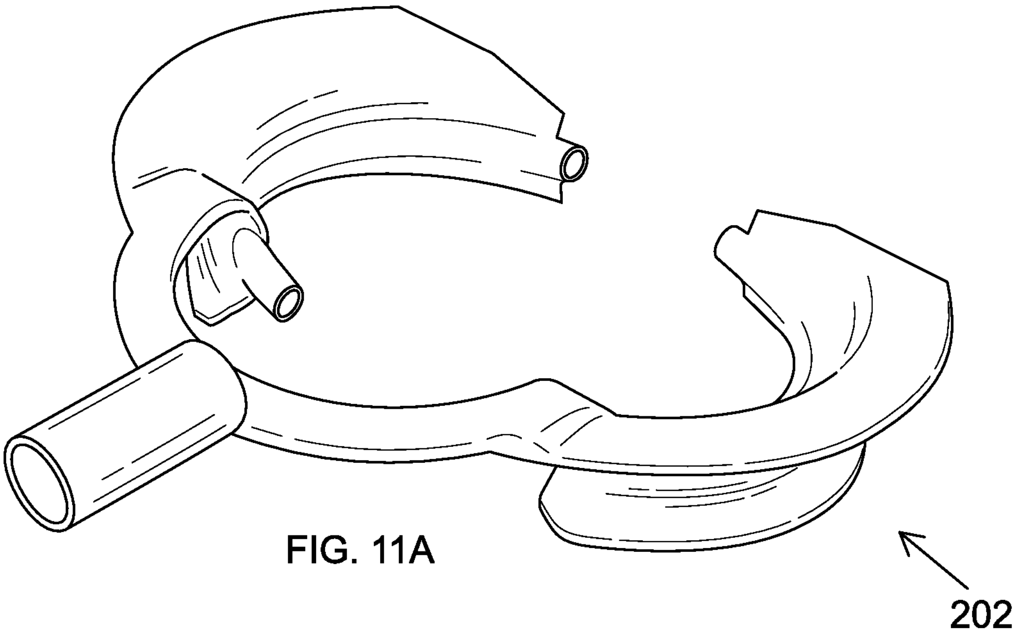
FIGS. 11A-F illustrate various views of the member of FIG. 10.
Figure 11B:
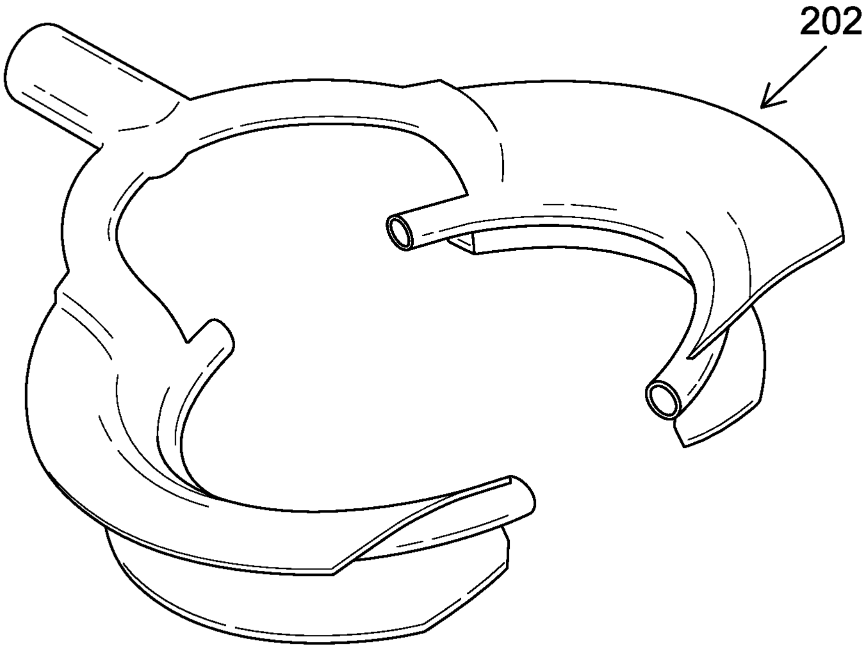
Figure 11C:
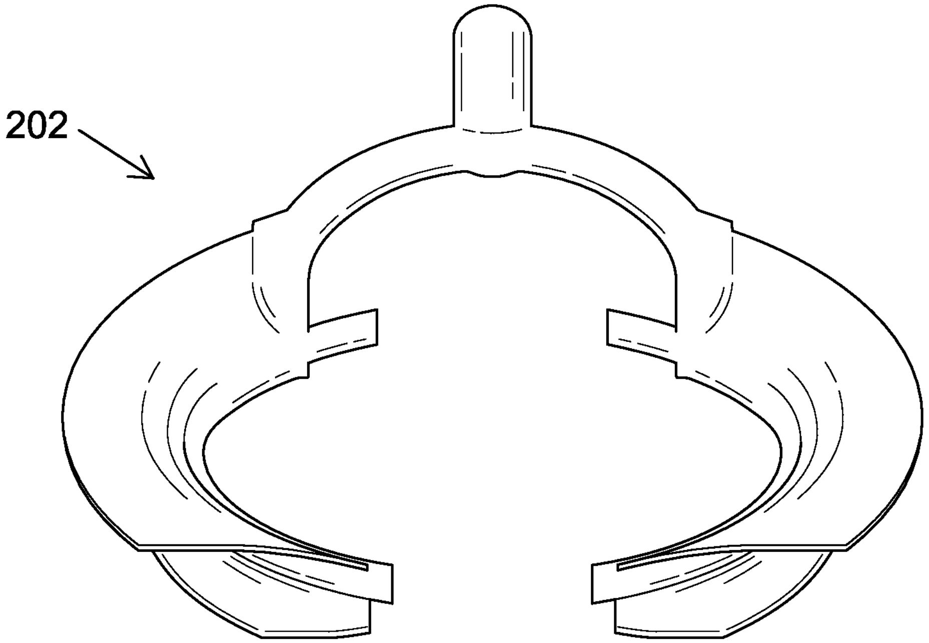
Figure 11D:
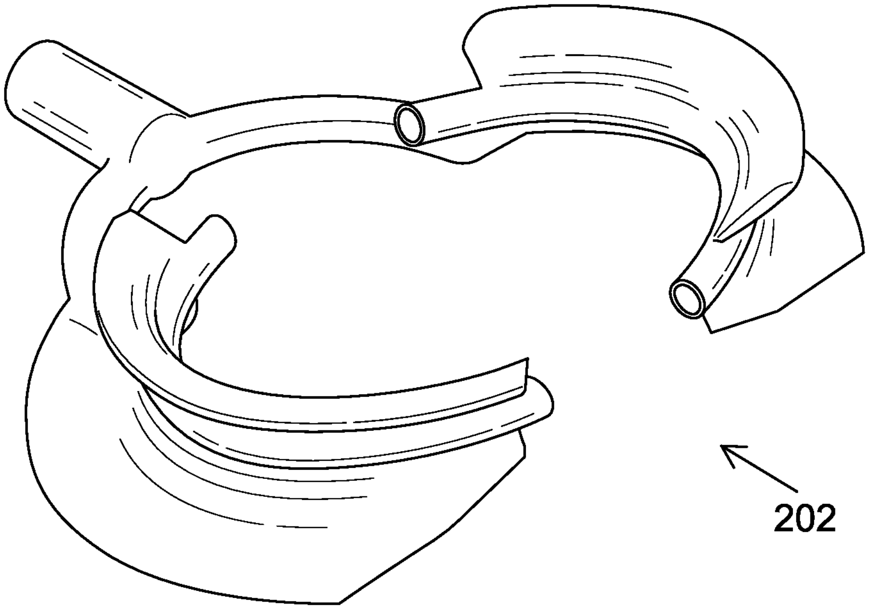
Figure 11E:
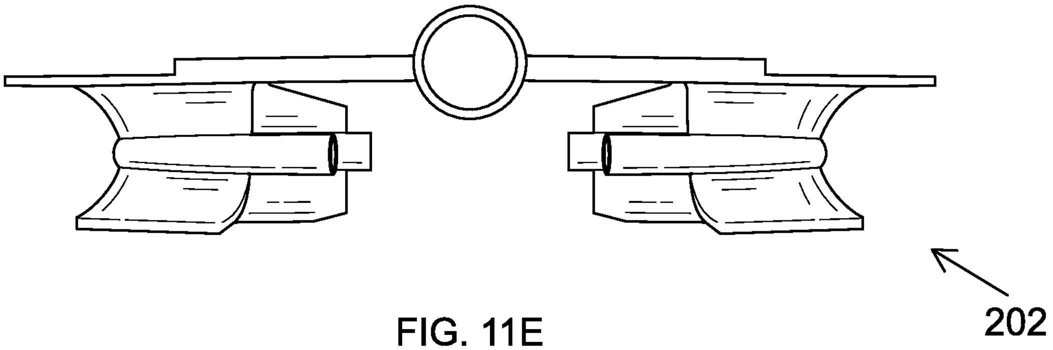
Figure 11F:
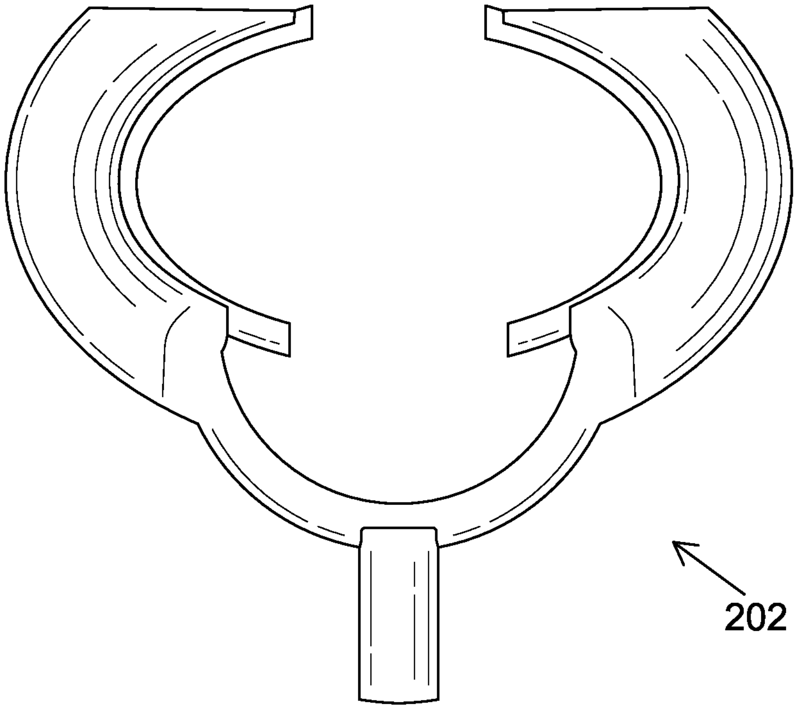

With reference to FIG. 1, during a dental procedure the patient is seated in a dental chair 50, and the dental professional is on either the left- or right-hand side of the patient. The dental chair 50 has a seat with leg supports, a seat back, armrests, and is typically positioned in a central region of a room.

The dental chair 50 may be adjacent to, provided with, or incorporated into a chair-side appliance 52 with a pneumatic and/or mechanical power source for dental handpieces. The chair-side appliance 52 also is provided with a vacuum system 54 with one or more suction hoses or lines, a compressed air source and a water source for with an irrigation nozzle or the like.

The vacuum system 54 in the appliance 52 has one or more suction line connectors 56 that are adjacent to the chair 50 and dental workstation or instrument tray. A suction tool may be connected via a hose to a suction line connector of the vacuum system. The vacuum system 54 has a vacuum pump and one or more separators or traps that are connected to the suction line connectors and provide a source of vacuum or low pressure. The vacuum system 54 may be periodically cleaned or sterilized, e.g. by cleaning the traps, running disinfectant and/or detergent through the lines, etc. According to one non-limiting example, the vacuum system 54 provides a vacuum level of 70 mmHg at the suction line connectors 56. For comparison, ambient pressure is at or near a standard atmospheric pressure of 760 mmHg.

A cheek retraction device 100, which may also be referred as a dental device 100 or dental retractor 100 according to various non-limiting examples, is provided according to the present disclosure, and is shown in FIGS. 2-9. The retractor 100 may be used with the dental chair 50 and vacuum system 54 as described above with reference to FIG. 1. Alternatively, the retractor 100 may be used in conjunction with other mouth or intra-oral suction devices or solely on its own as an aerosol suction device. The retractor 100 may be used during a dental procedure to move or retract the lips or lips and cheeks and provide improved access to and visibility of the oral cavity. The retractor 100 may additionally reduce contact of a dental instrument or tool with cheek tissue.

The retractor 100 has a member 102 that forms an arm 104, a first retractor 106 and a second retractor 108, e.g. as an integrally formed component. In one example, the member may 102 be formed from an autoclavable material. In another example, the member 102 may be formed from a material to be disposable and intended for single use. In one example, the member 102 may be formed from a three-dimensional printing process using a thermoplastic polymer, for example, a polyethylene terephthalate (PET) filament.

The arm 104 extends between and connects the first retractor 106 and the second retractor 108. The arm 104, first retractor 106, and second retractor 108 may generally cooperate to form a U-shaped or C-shaped member 102.

The first retractor 106 is sized to receive a portion of a lip and/or cheek of a patient. The first retractor 106 has or defines a first tube connector 110 and a second tube connector 112 at opposite ends of the first retractor 106. In one non-limiting example, the first and second tube connectors 110, 112 are provided by male barbed tube fittings.

The first retractor 106 has a first flange 116 and a second flange 118 extending from a first central region 114. The first and second flanges 116, 118 extend away from the second retractor 108 and define a recessed area therebetween to receive a portion of a patient lip.

The first retractor 106 defines a first internal passage 120 that extends longitudinally along the first retractor and between the first and second tube connectors 110, 112. The first internal passage 120 may extend for the entire length of the first retractor 106 according to one example, and as shown. The first internal passage 120 of the first retractor extends along the first central region 114.

The first retractor 106 also defines a series of first apertures 122. The first apertures 122 may extend transversely or radially through the first retractor 106, and intersect the first passage 120, such that the first apertures act as inlets to the first passage. The series of first apertures 122 may be provided with any number of apertures. The first apertures 122 are spaced apart from one another along the length of the first retractor. In one example, the first apertures 122 are spaced equidistant from one another along the first retractor 106. In another example, the first apertures 122 may be variably spaced along the first retractor 106. The first apertures 122 may be circular in cross-sectional shape, may have a rectangular or other slotted shape, or may have another shape. The first apertures 122 may have the same cross-sectional area as one another, and in another example, the first apertures may be provided with varying cross-sectional areas.

The second retractor 108 is opposed to or opposite to the first retractor 106. The second retractor 108 may be a mirror image of the first retractor 106 according to one example. The second retractor 108 is sized to receive another portion of a lip and/or cheek of a patient. The second retractor 108 has or defines a third tube connector 130 and a fourth tube connector 132 at opposite ends of the second retractor 108. In one non-limiting example, the third and fourth tube connectors 130, 132 are provided by male barbed tube fittings.

The second retractor 108 has a third flange 136 and a fourth flange 138 extending from a second central region 134. The third and fourth flanges 136, 138 extend away from the first retractor 106 and define a recessed area therebetween to receive a portion of a patient lip. The arm 104 is connected to the first and third flanges 116, 136.

The second retractor 108 defines a second internal passage 140 that extends longitudinally along the second retractor 108, and between the third and fourth tube connectors 130, 132. The second internal passage 140 may extend for the entire length of the second retractor 108 according to one example, and as shown. The second internal passage 140 of the second retractor 108 extends along the second central region.

The second retractor 108 also defines a series of second apertures 142. The second apertures 142 may extend transversely or radially through the second retractor 108, and intersect the second passage 140, such that the second apertures 142 act as inlets to the second passage. The series of second apertures 142 may be provided with any number of apertures. The second apertures 142 are spaced apart from one another along the length of the second retractor 108. In one example, the second apertures 142 are spaced equidistant from one another along the second retractor 108. In another example, the second apertures 142 may be variably spaced along the second retractor 108. The second apertures 142 may be circular in cross-sectional shape, may have a rectangular or other slotted shape, or may have another shape. The second apertures 142 may have the same cross-sectional area as one another, and in another example, the second apertures may be provided with varying cross-sectional areas.

The series of first apertures 122 and the series of second apertures 142 generally face towards one another, or face inwardly towards a central inner region of the device 100 such that aerosols flow from an oral cavity of a patient into the first and second passages 120, 140 via the first and second apertures.

The device 100 has a nasal tube 150 extending from a first end to a second end and defining a third internal passage 152. The nasal tube 150 extends between and mechanically couples the first retractor 106 and the second retractor 108. The first end of the nasal tube 150 is connected to the first tube connector 110, and the second end of the nasal tube is connected to the third tube connector 130. The nasal tube 150 is in fluid communication with the first passage 120 and/or the second passage 140. The nasal tube 150 is positioned generally opposite to the arm 104.

The nasal tube 150 defines a third aperture or a pair of apertures 154 extending radially though the nasal tube 150 and intersecting the third passage 152. The pair of apertures 154 faces away from the arm 104 and outwardly and away from the inner central region of the device 100 such that aerosols flow from a nasal passage of the patient into the third passage 152 via the third apertures 154.

The nasal tube 150 may also define a series of fourth apertures 156 extending through the nasal tube and intersecting the third passage 152. The fourth apertures 156 face towards the arm 104 such that aerosols flow from the oral cavity of the patient into the third passage 152 via the fourth aperture 156.

For the device 100, the first, second, and fourth apertures 122, 142, 156 face towards an inner central region of the device 100 such that aerosols flow from an oral cavity of a patient into the first, second, and third passages 120, 140, 152, via the first, second, and fourth apertures, respectively. The nasal tube 150, the first and second retractors 106, 108, and the arm 104 may collectively define the inner central region of the device 100.

The device 100 has a fluid connector 160 that is supported by or connected to the arm 104. The fluid connector 160 is in fluid communication with the first and second passages 120, 140. The fluid connector 160 is used to connect the dental device to a remote vacuum source, such as a vacuum source in a vacuum system associated with a dental chair or room.

In one example, and as shown, the device includes a fifth tube connector 162 and a sixth tube connector 164 that are in fluid communication with the fluid connector 160 via a fourth internal passage 166 that extends transversely through the arm 104. The fifth and sixth tube connectors 162, 164 may be adjacent to one another and furthermore, may be angled towards a respective one of the first and second retractors. The fifth and sixth tube connectors 162, 164 and the fourth internal passage 166 may be integrally formed with the arm 104. In one non-limiting example, the fifth and sixth tube connectors 162, 164 may be provided by male barbed tube fittings.

A vacuum connection tube 168 is connected to the dental device and to the arm 104 and fluid connector 160, and is shown in FIGS. 2-8. The vacuum connection tube 168 has a vacuum system fitting 170 on a distal end, and is configured to couple to a corresponding connector on the remote vacuum source.

In a further example, the fluid connector 160 includes a swivel joint or swivel connection. The vacuum connection tube 168 may be connected to the member 102 via the swivel joint. The swivel joint allows for rotation about an axis 172 extending through the arm 104 and extending between the first and second retractors 106, 108. During a dental procedure, the swivel joint allows for the vacuum connection tube 168 to go to either the right-hand side of the dental chair (taken from a patient perspective) or to the left-hand side of the dental chair. This allows the same dental device to be used by a right-handed or left-handed dental professional who may be seated on one side of the dental chair or the other.

The device 100 has a first chin tube 180 and a second chin tube 182 according to one example and as shown in FIGS. 2-8. The first chin tube 180 fluidly connects the first passage 120 of the first retractor to the fluid connector 160. The first chin tube 180 extends from a first end to a second end, with the first end connected to the second tube connector 112, and the second end connected to the fifth tube connector 162.

The second chin tube 182 fluidly connects the second passage 140 of the second retractor to the fluid connector 160. The second chin tube 182 extends from a first end to a second end, with the first end connected to the fourth tube connector 132, and the second end connected to the sixth tube connector 164.

In one example, the first and second chin tubes 180, 182 may be provided without apertures that extend transversely or radially though a sidewall, e.g. each chin tube may have a continuous sidewall without apertures for suction of aerosols. Alternatively, one or both of the first and second chin tubes 180, 182 are provided with one or more apertures that extend transversely or radially though a sidewall of the associated chin tube for suction and removal of aerosols from a patient mouth.

In another example, the device 100 is provided without the chin tubes, and the arm 104 forms internal passages that fluidly connect the first and second internal passages 120, 140 to the fluid connector 160.

According to various examples, the nasal tube 150, the first and second chin tubes 180, 182, and the vacuum connection tube 168 may be provided from the same tubing or from different type or diameter tubing. The use of the nasal tube and the first and second chin tubes allows the device to remain flexible for insertion and removal from a patient mouth, and also for patient comfort. The nasal tube, the first and second chin tubes, and the vacuum connection tube may be provided by flexible polymer tubing, such as TYGON tubing, and may be a medical or surgical grade of tubing.

In use, the nasal tube 150, the first and second chin tubes 180, 182, and the vacuum connector tube 168 are all attached to the member 102 to collectively provide the dental device or retractor assembly 100.

The member 102 is then bent or elastically deformed for insertion into a patient mouth. The first and second retractors 106, 108 receive portions of the patient's lip, and then the member 102 is released to return towards its initial shape.

The nasal tube 150 is adjacent to the patient's nose and nasal passages, and may be above or adjacent to the patient's upper lip. The first and second chin tubes 180, 182 and the arm 104 may be adjacent to the patient's chin, and may be below the patient's lower lip.

The swivel joint of the fluid connector 160 may then be used to position the vacuum connector tube 168 on the side of the patient corresponding to the chair-side appliance and the vacuum system, based on the location of the dental professional, and to minimize interference with the dental professional during the procedure. The device 100 may then be connected to the vacuum system via the vacuum system fitting.

When the vacuum line on the vacuum system corresponding to the device 100 is turned on by the dental professional, the vacuum system provides suction to and draws a vacuum on the device. Air, including aerosols, in the region of the oral cavity and patient mouth, are drawn into the third passage 152 in the nasal tube 150 by the series of fourth apertures 156. Likewise, air, including aerosols, in the region of the oral cavity and patient mouth, are drawn into the first and second passages 120, 140 in the first and second retractors 106, 108 via the series of first and second apertures 122, 142.

Air, including aerosols, in the region of the nasal passages and patient nose, are drawn into the third passage 152 in the nasal tube 150 by the pair of apertures 154.

Air, including aerosols, flows from the third passage 152, into the first and/or second passage 120, 140. From the first passage 120, air, including aerosols, flows into the first chin tube 180, to the fluid connector 160, to the vacuum tube 168, and to the vacuum system. From the second passage 140, air, including aerosols, flows into the second chin tube 182, to the fluid connector 160, to the vacuum tube 168, and to the vacuum system. Aerosols are removed from the patient's mouth and oral cavity by the device 100 during a procedure, and the dental professional has reduced exposure to aerosols.

After use, vacuum to the device 100 is turned off. The device 100 is then removed from the patient's mouth. For a disposable device 100, the device is then discarded. For a reusable device 100, the tubes 150, 168, 180, 182 may be removed, and the member 102 is then placed in an autoclave for cleaning and sterilization, with clean or new tubes subsequently used with the device. In other examples, the tubes are also autoclavable, and the entire device is placed in the autoclave.

The retractor device 100 may remove over ninety percent of aerosols from a patient when connected to the vacuum system, remove over eighty percent of aerosols from a patient when connected to the vacuum system, or remove over fifty percent of aerosols from a patient when connected to the vacuum system.

The retractor device 100 may be provided in multiple sizes, for example, for use with patient's with different size oral cavities, e.g. pediatric, adult small, adult large, and the like.

Unlike a saliva ejector, which connects to the vacuum system and collects liquids from within the patient's mount or oral cavity, the retractor device 100 according to the present disclosure collects aerosols, vapor, and gas from the patient's mouth as well as from the patient's nose.

The retractor device 100 may be used in place of or in conjunction with a stand-alone unit for air filtering and cleaning that is positioned within the room. The retractor device 100 may reduce the filtration and cleaning load on the stand-alone unit, improve room disinfection between patients, reduce transmission to the dental professional based on its positioning on the patient, uses less space within the room, and is a lower cost alternative or enhancement.

The device 100 according to the present disclosure may be used in conjunction with or in place of a dental dam. If the retractor 100 replaces a dental dam, the retractor device 100 may be more comfortable for a patient than the dental dam.

FIGS. 10-11 illustrates a member 202 according to another embodiment and for use with a cheek retraction or dental device, such as device 100. Elements in FIGS. 10-11 that are the same as or similar to those described with respect to FIGS. 2-9 are given the same reference numbers for simplicity, and unless otherwise described below, the member 202 is formed similarly to that described above for member 102.

The arm 104 of the member 202 is formed with internal passages 204 that fluidly connect the first and second internal passages 120, 140 to the barrel connector 206. The first and second internal passages may be integrally formed within the member 202. These internal passages may take the place of the two chin tubes described above. Note that the member 202 may be used with a nasal tube 150 as described above, or without a nasal tube.

The member 202 has first and second tube extensions 208, 210 that include the first and second passages 120, 140 of the first and second retractors. The first and second passages 120, 140 may intersect the end of the first and second tube extensions 208, 210 as shown. In one example, the first and second passages 120, 140 may be plugged or otherwise closed at the respective ends of the first and second tube extensions 208, 210 using caps or plugs to prevent fluid flow through the ends of the first and second tube extensions 208, 210, and such that the member 202 is used in a cheek retraction or dental device without any chin tube. In other examples, the first and second tube extensions 208, 210 may be used as connectors for a single chin tube that defines apertures to provide additional suction from the mouth of a patient into the device. The single chin tube has a first end connected to the first tube extension 208 and a second end connected to the second tube extension 210 such that the single chin tube extends between and fluidly couples the first tube extension to the second tube extension.

Furthermore, the member 202 may be provided with a barrel connector 206 as shown, where the barrel connector 206 does not provide for rotational movement of the vacuum connection tube within the barrel connector 206 and relative to the barrel connector. Alternatively, the member 202 may be provided with a swivel connector as described above in place of the barrel connector 206.

In addition to the features as described above, FIGS. 2-9 illustrate the cheek retraction device 100 and member 102 having an overall ornamental appearance according to a first embodiment, while FIGS. 10-11 illustrate another member 202 for a cheek retraction device 100 having an overall ornamental appearance according to a second embodiment.

While exemplary embodiments are described above, it is not intended that these embodiments describe all possible forms of the disclosure or invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A cheek retraction device comprising:

a member forming an arm extending between and connecting a first retractor and a second retractor, the first and second retractors opposed to one another, each of the first and second retractors extending from a first lower end region to a second upper end region and sized to receive a portion of a lip of a patient, wherein the first retractor defines a first internal passage and a first aperture, and wherein the second retractor defines a second internal passage and a second aperture, wherein the arm extends between and connects the first lower end region of the first retractor to the first lower end region of the second retractor;

a nasal tube defining a third internal passage, the nasal tube extending between and mechanically coupling the second upper end region of the first retractor and the second upper end region of the second retractor, the nasal tube in fluid communication with the first and second passages, the nasal tube being opposite to the arm, the nasal tube defining a third aperture;

a fluid connector supported by the arm and in fluid communication with the first and second passages, the fluid connector to connect the cheek retraction device to a remote vacuum source;

wherein the first aperture and the second aperture face towards one another such that aerosols flow from an oral cavity of a patient into the first and second passages via the first and second apertures; and wherein the third aperture faces away from the arm such that aerosols flow from a nasal passage of the patient into the third passage via the third aperture.

2. The cheek retraction device of claim 1 further comprising a vacuum connection tube connected to the arm via the fluid connector, and a vacuum connector configured to couple to a corresponding connector on the remote vacuum source.

3. The cheek retraction device of claim 1 wherein the first retractor defines a first tube connector positioned at the associated second first end region, and the second retractor defines a second tube connector positioned at the associated second upper end region; and wherein the nasal tube has a first end connected to the first tube connector and a second end connected to the second tube connector.

4. The cheek retraction device of claim 3 wherein the first lower end region of the first retractor defines a third tube connector positioned adjacent to the arm, and the first lower end region of the second retractor defines a fourth tube connector positioned adjacent to the arm;

wherein the cheek retraction device further comprises a fifth tube connector and a sixth tube connector supported by the arm and in fluid communication with the fluid connector; and wherein the cheek retraction device further comprises a first chin tube having a first end connected to the third tube connector and a second end connected to the fifth tube connector, and a second chin tube having a first end connected to the fourth tube connector and a second end connected to the sixth tube connector.

5. The cheek retraction device of claim 4 wherein the arm defines a fourth internal passage extending transversely through the arm and fluidly connecting the first and sixth tube connectors to the fluid connector.

6. The cheek retraction device of claim 4 wherein the first and second chin tubes are without apertures through a sidewall thereof.

7. The cheek retraction device of claim 1 wherein the arm of the member defines a fourth internal passage fluidly connecting the first and second internal passages and the fluid connector.

8. The cheek retraction device of claim 1 wherein the first retractor has a first flange and a second flange extending from a first central region, the first and second flanges extending away from the second retractor; and wherein the second retractor has a third flange and a fourth flange extending from a second central region, the first and fourth flanges extending away from the first retractor.

9. The cheek retraction device of claim 8 wherein the first internal passage of the first retractor extends along the first central region;

wherein the second internal passage of the second retractor extends along the second central region; and wherein the arm is connected to the first and third flanges.

10. The cheek retraction device of claim 1 wherein the first aperture is further defined as a series of first apertures extending radially through the first retractor and spaced apart from one another; and wherein the second aperture is further defined as a series of second apertures extending radially through the second retractor and spaced apart from one another.

11. The cheek retraction device of claim 1 wherein the third aperture is further defined as a pair of apertures extending radially through the nasal tube and spaced apart from one another.

12. The cheek retraction device of claim 1 wherein the nasal tube defines a fourth aperture, the fourth aperture facing towards the arm such that aerosols flow from the oral cavity of the patient into the third passage via the fourth aperture.

13. The cheek retraction device of claim 1 wherein the member is formed from an autoclavable material or a disposable material.

14. The cheek retraction device of claim 13 wherein the member is formed from three-dimensional printing process using PET filament.

15. A cheek retraction device comprising:

a member forming an arm extending between and connecting a first retractor and a second retractor, the first and second retractors opposed to one another, each of the first and second retractors sized to receive a portion of a lip of a patient, wherein the first retractor defines a first internal passage and a first aperture, and wherein the second retractor defines a second internal passage and a second aperture;

a nasal tube defining a third internal passage, the nasal tube extending between and mechanically coupling the first retractor and the second retractor, the nasal tube in fluid communication with the first and second passages, the nasal tube being opposite to the arm, the nasal tube defining a third aperture;

a fluid connector supported by the arm and in fluid communication with the first and second passages, the fluid connector to connect the cheek retraction device to a remote vacuum source;

wherein the first aperture and the second aperture face towards one another such that aerosols flow from an oral cavity of a patient into the first and second passages via the first and second apertures;

wherein the third aperture faces away from the arm such that aerosols flow from a nasal passage of the patient into the third passage via the third aperture; and wherein the fluid connector further comprises a swivel joint, the swivel joint rotating about an axis extending through the arm and extending between the first and second retractors.

16. A cheek retraction device comprising:

a member forming an arm extending between and connecting a lower end region of a first retractor and a lower end region of a second retractor, the first and second retractors opposed to one another, each of the first and second retractors sized to receive a portion of a lip of a patient, wherein the first retractor defines a first internal passage extending between first and second tube connectors and a first series of apertures extending transversely therethough and intersecting the first internal passage, and wherein the second retractor defines a second internal passage extending between third and fourth tube connectors and a second series of apertures extending transversely therethough and intersecting the second internal passage;

a nasal tube extending between and mechanically coupling an upper end region of the first retractor and an upper end region of the second retractor, the nasal tube being opposite to the arm, the nasal tube having a first end connected to the first tube connector and a second end connected to the third tube connector, the nasal tube defining a third internal passage in fluid communication with at least one of the first and second passages, the nasal tube defining a pair of apertures extending radially through the nasal tube, the nasal tube defining a third series of apertures extending radially through the nasal tube; and a fluid connector supported by the arm to connect the cheek retraction device to a remote vacuum source, the fluid connector in fluid communication with the first and second internal passages;

wherein the first series of apertures, the second series of apertures, and the third series of apertures face towards an inner central region of the cheek retraction device one another such that aerosols flow from an oral cavity of a patient into the first, second, and third passages via the first, second, and third series of apertures, respectively; and wherein the pair of apertures face away from the arm and away from the inner central region of the cheek retraction device such that aerosols flow from nasal passages of the patient into the third passage via the pair of apertures.

17. The cheek retraction device of claim 16 wherein the fluid connector has fifth and sixth tube connectors, the cheek retraction device further comprising:

a first chin tube having a first end connected to the second tube connector and a second end connected to the fifth tube connector to fluidly connect the fluid connector with the first passage; and a second chin tube having a first end connected to the fourth tube connector and a second end connected to the sixth tube connector to fluidly connect the fluid connector with the second passage.

18. The cheek retraction device of claim 16 wherein the swivel joint rotates about an axis extending through the arm and extending between the first and second retractors.

19. The cheek retraction device of claim 16 wherein the arm defines a third internal passage fluidly connecting the first and second internal passages with the fluid connector.

* * * * *